Nov. 30, 1965 H. M. SMITH ETAL 3,220,170
VEGETATION MOWER AND BLADE
Filed Sept. 17, 1964 2 Sheets-Sheet 1

Harry M. Smith
Harry M. Swindler
INVENTORS

BY

ATTORNEYS

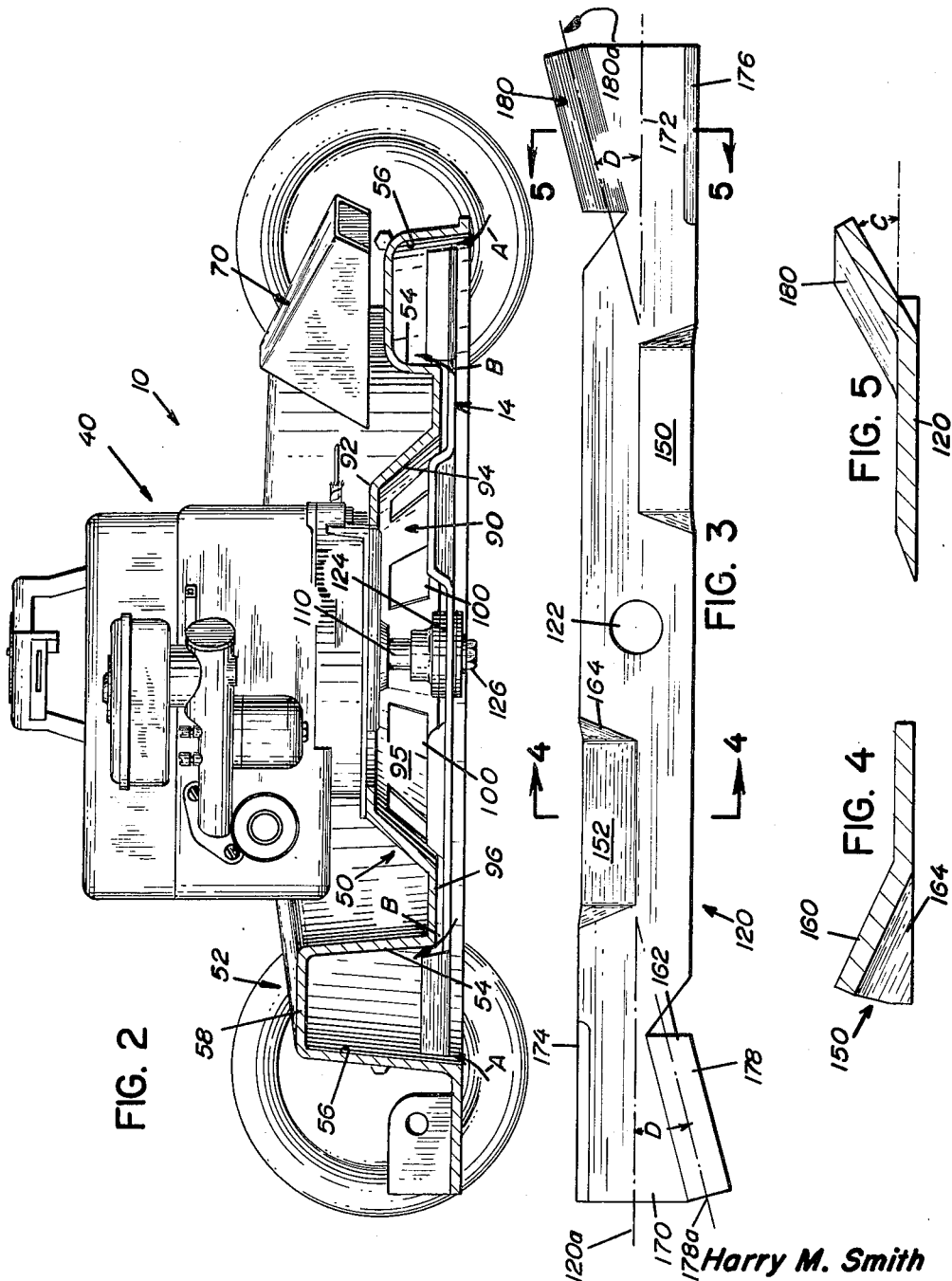

United States Patent Office 3,220,170
Patented Nov. 30, 1965

3,220,170
VEGETATION MOWER AND BLADE
Harry M. Smith and Harry M. Swindler, Lexington, Va., assignors to Industrial Products Corporation, Lexington, Va., a corporation of Virginia
Filed Sept. 17, 1964, Ser. No. 397,143
9 Claims. (Cl. 56—255)

This invention relates generally to apparatus for cutting vegetation, and is particularly concerned with an improved vegetation mower of the rotary type and an improved blade structure for use in a rotary mower.

While apparatus for cutting vegetation may be used in various ways, the most common use to which such apparatus is put is that of cutting grass or the like. Thus, while not so limited, the present invention is discussed and described in connection with rotary type so-called "lawn mowers," although it is to be understood that the invention can be employed for cutting various types of vegetation.

Rotary type lawn mowers, in a most basic sense, include at least a housing structure supported on ground-engaging wheels, a blade element or elements mounted for rotation about a vertical axis within the housing, means to drive the blade element or elements, and a handle extending upwardly from the housing whereby a user can guide or push the assembly over a surface to be mowed. Operation of a mower of this type depends upon the cutting of the grass or other vegetation through impact therewith of a sharp edge rotating in a horizontal plane.

When surface vegetation is cut with the conventional type lawn mower, it is common for the user to find that the surface has a striped appearance after the cutting operation is completed. This appearance results from the rather uniform deposit of discharged cuttings to the side of the mower in generally uniform relatively narrow paths. To eliminate this undesirable appearance, it has been suggested that collection bags or the like be used with the lawn mower so that the discharge cuttings are accumulated therein. However, the use of a collection bag in and of itself results in additional expense. Moreover, conveying of the cuttings being discharged into the bag can create a problem.

Aside from the above, in operating the conventional rotary type lawn mower, as indicated, the efficiency of the cutting operation depends upon the condition of the vegetation at the time it is contacted by the cutting edge of the lawn mower blade. For best results and a uniform cut, the vegetation should be extended in an upright position so that there is a clean impact and uniform cutting height over an entire surface. Such an ideal condition may exist for a very small area of any given lawn or surface having vegetation thereon, but in the usual instance, the vegetation itself is not necessarily upright in position when the cutting edge comes in contact therewith.

Moreover, and of equal importance, with prior types of rotary mowers wherein fan means have been used to facilitate the conveyance of the cuttings to be discharged, drafts are created which tend to result in pushing the vegetation to one side or the other so that even if the same is growing in an upright position, the drafts may cause the same to assume an oblique position with respect to the cutting edge during operation of the lawn mower.

The foregoing paragraphs are not intended to present a comprehensive and/or exhaustive discussion of various problems which are encountered with rotary type mowers, but instead, such paragraphs are presented to illustrate the background of the present invention, and to facilitate an understanding thereof.

In a most basic sense, the present invention is directed to the provision of an improved lawn mower or vegetation cutting apparatus which insures automatic proper positioning of the vegetation for desired impact with the cutting blade, and which eliminates undesired discharge accumulations on a surface over which the apparatus is moved.

The invention can be regarded as having two phases, namely, the provision of an improved blade structure for a rotary type lawn mower which automatically creates drafts that properly position the vegetation to be cut with respect to the cutting edges of the blade structure, and the provision of a lawn mower assembly including a cooperating housing arrangement and blade structure that serve not only to properly position the vegetation to be cut for proper impact with the cutting edges, but which also serve to conveniently either mulch and uniformly distribute the cuttings being discharged or conveniently deliver the same to a collection means such as a collection bag. Although these respective aspects of the present invention are somewhat separate in nature, they are considered together in following paragraphs of this specification for convenience.

Consistent with the foregoing, it is a primary object of the present invention to provide a rotary type lawn mower including a housing and a blade structure rotatably mounted therein but in which the housing has a chute extending over the path of the cutting edges of the blade structure, and the blade structure carries fan means cooperating with the chute to induce therein a discharge flow and simultaneously incoming drafts that serve to lift the vegetation to be cut into an upright position for proper impact with the cutting edges of the blade structure. A further object of the present invention, in this regard, is to provide such a lawn mower assembly which further uses the drafts created so as to prevent the accumulation of any cuttings in the central area of the housing surrounded by the aforesaid chute.

With respect to the discharge of cut material from the lawn mower assembly, it is a specific object of the present invention to provide an improved mower of the rotary type which retains the cut material in a specific compartment of the frame or housing for ejection in a controlled predetermined direction outwardly from the frame or housing, or alternatively, for delivery into a receptacle designed to receive and contain the cuttings.

With respect to the provision of a lawn mower assembly which insures uniform cutting height of the vegetation on the surface over which the assembly is moved, it is a specific object of the present invention to create pressure differentials within the lawn mower housing by inducing air flows into the housing chute under respective inner and outer chute-defining walls, so that the air flows travel upwardly into the chute to lift the vegetation into an erect or vertical position for smooth cutting. Further in this connection, it is an object hereof to provide such an assembly wherein air flows are induced from a central compartment within the lawn mower housing into and through the chute as well as from the outer periphery of the assembly into and through the chute.

In accordance with the invention, the blade member is so constructed as to induce a downwardly directed air flow at the central portion thereof and then translate such air flow radially outward and into an upward air flow in the area of the vegetation to be cut. The cooperating housing, in turn, preferably includes a continuously vertically expanding helical chute cooperating with the respectively opposite outer end portions of the blade structure having fins thereon whereby all of the cuttings are not only lifted to a vertical or upright position under the chute for proper cutting thereof, but additionally, whereby all of the cuttings are maintained in the chute itself as a separate and distinct compartment from the remaining portions of the lawn mower housing, so that such cuttings can be discharged in a controlled manner.

The arrangement in such that the blade structure can be formed as an integral one-piece bar member having draft-creating recesses or pockets in the central portion thereof and having upstanding fins and cutting edges on the outer ends thereof. Similarly, the housing is so designed that it can be cast as a unitary member adapted to support a power means such as a gas motor thereon, and further adapted to have suitable wheel means and a handle assembly connected therewith.

The invention resides in the blade structure, and in the combination of such blade structure with the preferred form of housing used in a lawn mower constructed in accordance herewith. The invention will be better understood and objects other than those specifically set forth above will become apparent when consideration is given to the following detailed description. Such description makes reference to preferred and illustrative embodiments of the invention presented in the annexed drawings.

In the drawings:

FIGURE 2 is a side view, partially in section, of the apparatus shown in FIGURE 1;

FIGURE 3 is a plan view of a blade structure incorporated in the apparatus of FIGURES 1 and 2 consistent herewith;

FIGURE 4 is a fragmental detailed view taken on the lines 4—4 of FIGURE 3; and

FIGURE 5 is a fragmental detailed sectional view taken on the lines 5—5 of FIGURE 3.

Figure 1:
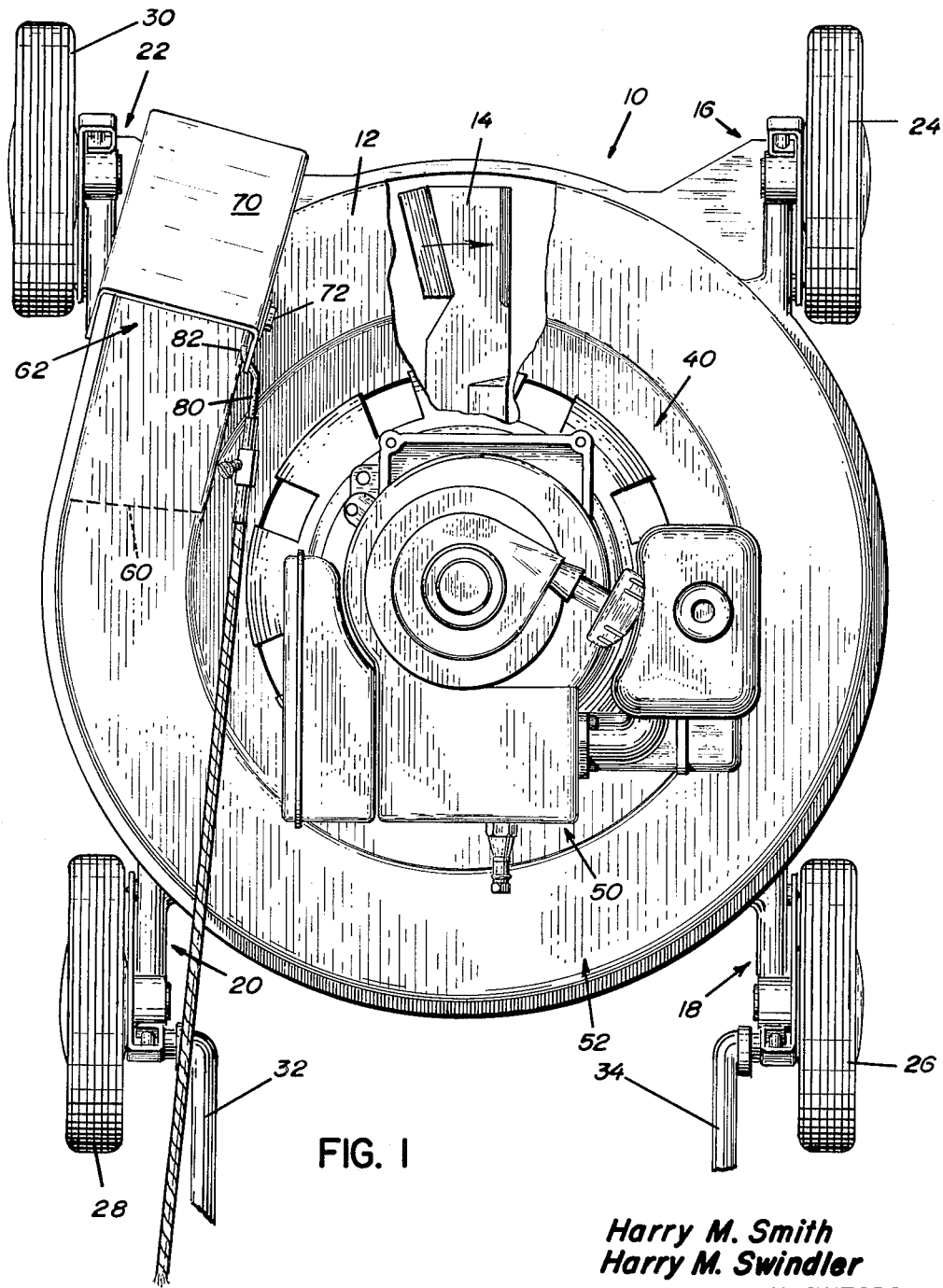
FIGURE 1 is a plan view, partially broken away, of a vegetation cutting apparatus constructed in accordance herewith.

The overall lawn mower shown in FIGURES 1 and 2 is generally designated by the numeral 10. This lawn mower has a blade enclosing housing 12 and a blade element 14 rotatably mounted therein. Support brackets 16, 18, 20 and 22 extend from the housing respectively at the front and rear sides thereof, and wheels 24, 26, 28 and 30 are suitably mounted on the brackets. Similarly, a handle assembly including lower arms 32 and 34 is pivotally connected with the housing. The particular type of handle, the particular wheels, the particular brackets, and like details are not significant factors insofar as the instant invention is concerned.

Instead, any suitable handle assembly, any suitable wheels, and any suitable means for coupling the wheels to the housing can be incorporated.

In like manner, while the power means is shown in the figures as a single cylinder gasoline internal combustion engine 40, the power means can be an electric motor, or other forms of gas motors, or in fact, any other suitable power means without departing from the scope and spirit of the invention. It is to be noted, however, that the power means 40 is preferably mounted centrally of the housing 12.

The housing 12 has a central portion 50 and an outer peripheral chute portion 52. The chute portion 52 surrounds the central portion 50. The chute itself comprises inner and outer spaced apart arcuate skirt walls 54 and 56, and a roof wall 58 extending therebetween. The roof wall tapers upwardly continuously from its starting location indicated by the dotted line 60 in FIGURE 1 about the periphery of the housing. As a result, the chute portion 52 expands helically continuously about the periphery of the central portion 50 of the housing. The outlet of the chute, generally designated by the numeral 62, is directed forwardly with the terminal extremity of the chute proper terminating in overlying relation to the entrance end of the chute—i.e., past the starting line 60 of the chute.

For purposes of directing the cut vegetation leaving the chute, a sleeve member 70 is pivotally mounted at the forward or discharge end of the chute by pivot bolt means 72. The sleeve 70 can be adjusted so that the discharged cuttings are directed forwardly of the mower for repeated mulching action after the discharge.

For convenience, and if desired, a suitable flexible cable 80 can be attached to a rearwardly extending lug 82 of the sleeve 70 at one end, and this cable can be extended to the handle of the lawn mower so that an operator can adjust the pivotal mounting of the sleeve conveniently as desired.

The central portion 50 of the housing 12 is defined by wall means 90. The wall means 90 includes a roof wall 92, an outwardly and downwardly tapering ring wall 94, and a connecting wall 96 extending between the base of the wall 94 and the lower edge of the inner skirt wall 54. The wall means 90 thus forms a downwardly opening compartment 95. The compartment 95 communicates with the chute 52 only under the lower edge of the inner skirt wall 54. The wall means 90, and in particular, the ring wall 94, has a plurality of preferably equally spaced apart openings 100 therein. These openings have their lowest edges located in a plane above the plane of the lower edge of the inner skirt wall 54.

The power means 40 is mounted on the roof wall 92 of the compartment 95 and thus, as indicated, is disposed centrally of the assembly. The helically expanding chute 52 extends peripherally about the central portion, as also indicated, with the arrangement being thus generally uniformly balanced about its central vertical axis.

The power means 40 includes an output power shaft 110 which projects into the compartment 95 and preferably carries a threaded end portion thereon for mounting of the blade structure 14. Here again, the particular form of the output shaft and the particular form of the coupling of the shaft with the blade is not a critical factor insofar as the present invention is concerned. At the same time, for best results consistent with the objects set forth at the outset of the present specification, it is desirable to have the housing formed with the downwardly opening central compartment and to have the peripheral helically expanding chute surrounding the same. Furthermore, it is to be noted that the outer skirt wall 56 of the chute 52 has its lower edge terminating in a plane below that in which the lower edge of the inner skirt wall 54 is disposed. The outer skirt wall, in other words, extends lower than the inner skirt wall about the chute.

The blade structure 14 preferably comprises a one-piece bar member 120 having a central aperture 122 thereof which permits the same to be easily mounted with respect to the output shaft 110. In this regard, it will be understood that the output shaft preferably carries a simple clutch 124 thereon, and the blade 14, or specifically the aperture 122, cooperates with the clutch assembly being fixed in position ultimately by the nut 126.

The bar member 120 also has a central portion and opposed end portions. When the bar member 120 is mounted in operative position, as shown in FIGURE 2, the central portion of the bar member underlies the compartment 95 and the outer end portions of the bar member are within the chute 52. The bar member extends under the lower edge of the inner skirt wall 54 and terminates adjacent and within the outer skirt wall 56. Preferably, the blade or bar member 120 as shown in FIGURE 2, has its lower extremity disposed above the plane of the lower extremity of the outer skirt wall 56.

The central portion of the bar member includes a pair of cup-like pockets 150 and 152. These pockets, as best shown in FIGURE 3, open in opposite directions. The pockets are formed by offsetting a portion of the bar member 120 upwardly with respect to the major plane of the bar member. The offset includes a top wall 160 and tapered side walls 162 and 164 so arranged that the pockets open forwardly of one side edge of the bar member and downwardly with respect thereto. FIGURE 4 is a sectional view taken through the pocket 152, and by referring thereto, it will be clearly seen that the pocket is formed as an integral recess in the bar member 120.

The respective pockets 150 and 152 are equally spaced from the center axis of the blade member, i.e., the axis of the aperture or bore 122 therein. Yet, the pockets are disposed on opposite sides of the central longitudinal axis of the bar member.

If reference is again made to FIGURE 2, it will be noted that the pocket 150 is shown therein as opening forwardly, whereas the pocket 152, as shown therein, opens rearwardly. These pockets face in the direction of rotation of the blade in operation, and accordingly, when the blade is rotated, these cup-like pockets induce an air flow downwardly through the openings 100 in the ring wall 94 into the compartment 95. This downward flow, as explained more fully hereinafter, is used essentially for two purposes. First, the incoming air is drawn from above the central portion of the housing and thus the air stream serves to partially cool the motor. More importantly, and more significantly, the air flow is used to maintain the compartment 95 free of cut vegetation accumulation, and also as a source for the main air flow through the chute 52.

In this latter regard, attention is again directed to FIGURES 2 and 3. From these figures, it will be noted that the respectively opposite outer end portions 170 and 172 of the bar member 120 have oppositely facing cutting edges 174 and 176 thereon. These cutting edges are formed by beveling the marginal edge of the bar member 120 to a sharp terminal edge line. The cutting edges are disposed in a plane above the plane of the lower edge of the outer skirt wall 56, as previously explained.

The end portions 170 and 172 of the bar member 120 further have upstanding fins 178 and 180 thereon. The fin 178 is disposed behind the cutting edge 174 whereas the fin 180 is disposed behind the cutting edge 176. The term "behind" is used with respect to the direction of rotation of the blade.

The fins 178 and 180 are purposely shaped as shown and disposed angularly as shown for specific air flow reasons. In particular, as shown in FIGURE 5, the fin 180 tapers upwardly from the plane of the bar 120 at an acute angle C. The same is true of the fin 178. Moreover, both such fins, in operative position, are located within the chute 52 between the inner and outer skirt walls, and with at least the top portions of the fins being disposed at a level above the lower edge of the inner skirt wall 54. It is important to note that the fins are at least partially within the chute, and preferably a substantial portion of each of the fins is within the chute. Again, this feature is important from the air flow standpoint.

The respective fins 178 and 180 are, furthermore, elongate and generally rectangular or rhombic in shape. The longitudinal axes 178a and 180a are disposed at an acute angle D with respect to the longitudinal axis 120a of the bar member. The angular disposition of the fins with respect to the center line of the bar member 120 is particularly important because this angular disposition compensates for centrifugal forces and, moreover, results in the creation of the air flows to now be described.

With the fins 178 and 180 constructed and arranged as described, and with the cup-like pockets 150 and 152 disposed as described, then, as the blade rotates, a reduced pressure is created under and behind the fins and an incoming draft is created in the central compartment 95. The reduced pressure under and behind the fins is substantially reduced adjacent the lower edge of the inner skirt wall 54 so that an air flow is maintained from the central compartment 95 under the lower edge of the inner skirt wall 54, and then upwardly into the chute 52. Also because of the reduced pressure, there is an air flow inwardly under the lower edge of the outer side wall 56 of the chute 52. Therefore, as indicated by the respective arrows A and B in FIGURE 2, the air coming into the chute is directed upwardly therein. The incoming air passing under the edge of the outer skirt wall 56 has a tendency to move radially inwardly, but this tendency is offset by the tendency of the incoming air under the lower edge of the inner skirt wall 54 to move outwardly and by the compensation for the centrifugal force established by virtue of the angular disposition of the fins 178 and 180 with respect to the central axis of the bar 120. The net result is that there is a generally vertical up-draft of air immediately adjacent the cutting edges of the blades as the blade rotates. This causes the vegetation, in essence, to be sucked to an upright or a vertical position at the time it is struck by the sharp cutting edge of the blade. A uniform height is thus insured for the cut as the apparatus is moved over a surface having vegetation thereon.

Equally as important as the input draft to the chute, is the draft created in the chute itself. The fins 178 and 180 establish a forwardly moving continuous air flow toward the discharge end or outlet 62 of the chute. Accordingly, as the vegetation is cut, the cuttings are maintained within the chute and directed forwardly so as to be discharged therefrom in front of the apparatus for subsequent mulching, with control over the discharge being established, if desired, by pivotal adjustment of the sleeve 70.

Since the draft created by the apparatus hereof positively maintains all of the cut vegetation within a confined area of the housing, namely within the chute 52, and since the same also establishes an efficient draft, it is quite easy to use this same draft to convey the cut vegetation to the proper receptacle, bag, or the like.

The operational advantages described above are performed with maximum efficiency when the blade structure is used in combination with a housing as described. Furthermore, the respective components can be very simply constructed with the housing 12, including its chute, central portion, and associated brackets, being formed as a housing, and with the blade structure being formed by simple cutting, bending and stamping operations, all as a single piece.

Notwithstanding the unusual efficiency which is obtainable with the combination described, the improved blade structure itself can be used with conventional type housings to advantage. The cup-like pockets in the central portion of the blade structure and the fin disposition in association with the cutting edges necessarily establishes an up-draft in the area of the material to be cut even in instances where a chute, such as the chute 52, is not specifically included in the housing. Moreover, by merely using apertures in the central portion of a conventional housing, a general up-draft resulting from air flows on opposite sides of the path of the cutting blade can be established with the blade structure hereof, thus insuring at least better performance of the conventional mower, even though such performance may not achieve the maximum efficiency of the combination described.

Before concluding, it should be noted that while the angle D has been referred to above as an acute angle, it has been found particularly desirable to make this angle about 15 degrees, and preferably in any event between 10 and 35 degrees. Moreover, it is to be understood that the inner bottom corner of the fin 180 is closer to the central axis 172 of the bar member 120 than the outer bottom corner or edge portion so that the innermost end of the fin leads the fin in respect to the direction of rotation.

After reading the foregoing descripton, it should be apparent that the objects set forth above have been successfully obtained. Accordingly, what is claimed is:

1. For use with a vegetation mower of the rotary type a cutting blade comprising:
 (a) a bar member having a central portion and opposed end portions;
 (b) said central portion of said bar member including a pair of recessed pockets disposed on opposite sides of the center thereof, said pockets opening in opposite directions;

(c) respectively opposite outer end portions of said bar member having oppositely facing cutting edges thereon;

(d) said respectively opposite outer end portions of said bar member having upstanding fins thereon, one said fin being disposed respectively behind each of said cutting edges with respect to the direction of rotation of said blade;

(e) said fins tapering upwardly from the plane of said bar member at an acute angle;

(f) said fins being elongated and having their longitudinal axes disposed at an acute angle with respect to the longitudinal axis of said bar member.

2. A cutting blade as defined in claim 1 wherein said bar member is substantially flat except for said pockets and said fins.

3. A cutting blade as defined in claim 2 wherein said fins are planar.

4. A cutting blade as defined in claim 3 wherein said pockets and said fins are formed integrally with said bar member.

5. In a vegetation mower of the rotary type having a blade enclosing housing an a cutting blade rotatably mounted in said housing, the improvements comprising:

(a) said housing having a central portion and an outer peripheral helically expanding chute portion surrounding said central portion; said chute portion comprising inner and outer spaced apart arcuate skirt walls and a roof wall extending therebetween, said outer skirt wall terminating in a horizontal plane below said inner skirt wall;

(b) said central portion of said housing being defined by wall means forming a downwardly opening compartment, said central portion of said housing communicating with said chute under the lower edge of said inner skirt wall, said wall means defining said compartment having at least one opening therein;

(c) said blade comprising a bar member having a central portion and opposed end portions, said bar member extending under the lower edge of said inner skirt wall and terminating adjacent and within said outer skirt wall;

(d) said central portion of said bar member including draft creating elements disposed on opposite sides of the center thereof, said elements being disposed in said compartment to induce an air flow downwardly through said opening in said wall means into said compartment when said blade is rotated;

(e) respectively opposite outer end portions of said bar member having oppositely facing cutting edges thereon, said cutting edges being disposed in a plane above the plane of the lower edge of said outer skirt wall;

(f) said respectively opposite outer end portions of said bar member having upstanding fins thereon, one said fin being disposed respectively behind each of said cutting edges with respect to the direction of rotation of said blade;

(g) said fins tapering upwardly from the plane of said bar member at an acuate angle with at least the top portion of said fins located in said chute between said inner and outer skirt walls and above the lower edge of said inner skirt wall;

(h) said fins being disposed to create under and behind said fins, as said blade rotates, reduced pressure with the pressure being more substantially reduced adjacent said inner skirt wall but generally uniformly reduced under said chute and with an air flow being created through said chute in the direction of rotation of said blade member due to air traveling into said chute upwardly from under the lower edge of said inner side wall and upwardly under the lower edge of said outer skirt wall to thereby lift the vegetation to be cut upwardly with the air flow into the said chute and to thereby prevent accumulation of vegetation in said compartment due to the air flow therefrom.

6. The improvement defined in claim 5 wherein said chute has a forwardly opening discharge outlet; and means for adjusting the discharge direction of material leaving said chute.

7. The improvement defined in claim 5 wherein said wall means has a plurality of openings disposed symmetrically therein.

8. In a vegetation mower of the rotary type having a blade enclosing housing and a cutting blade rotatably mounted in said housing, the improvement comprising:

(a) said housing having a central portion and an outer peripheral chute portion surrounding said central portion;

(b) said chute portion comprising inner and outer spaced apart arcuate skirt walls and a roof wall extending therebetween, said roof wall tapering upwardly continuously such that said chute expands helically continuously about the periphery of said central portion of said housing, said outer skirt wall terminating in a horizontal plane below said inner skirt wall;

(c) said central portion of said housing being defined by wall means forming a downwardly opening compartment, said compartment communicating with said chute only under the lower edge of said inner skirt wall, said wall means defining said compartment having at least one opening therein having its lowest edge located in a plane above the plane of the lower edge of said inner skirt wall;

(d) said blade comprising a bar member having a central portion and opposed end portions, said bar member extending under the lower edge of said inner skirt wall and terminating adjacent and within said outer skirt wall;

(e) said central portion of said bar member including a pair of cup-like pockets disposed on opposite sides of the center thereof, said pockets opening in opposite directions and being disposed in said compartment to induce an air flow downwardly through said opening in wall means into said compartment when said blade is rotated;

(f) respectively opposite outer end portions of said bar member having oppositely facing cutting edges thereon, said cutting edges thereon, said cutting edges being disposed in a plane above the plane of the lower edge of said outer skirt wall;

(g) said respectively opposite outer end portions of said bar member having upstanding fins thereon, one said fin being disposed respectively behind each of said cutting edges with respect to the direction of rotation of said blade;

(h) said fins tapering upwardly from the plane of said bar member at an acute angle with at least the top of said fins located in said chute between said inner and outer skirt walls and at least with the top portions of said fins disposed at a level above the lower edge of said inner skirt wall;

(i) said fins being elongated and having their longitudinal axes disposed at an acute angle with respect to the longitudinal axis of said bar member to create under and behind said fins, as said blade rotates, reduced pressure with the pressure being more substantially reduced adjacent said inner skirt wall but generally uniformally reduced under said chute, said fins creating an airflow through said chute in the direction of rotation of said blade member due to air traveling into said chute upwardly from under the lower edge of said inner side wall and upwardly under the lower edge of said outer skirt wall to thereby lift the vegetation to be cut upwardly with the air flow into the said chute, and to thereby prevent accumulation of vegetation in said compartment due to the air flow therefrom.

9. The improvement defined in claim 8 wherein the angle between the longitudinal axis of said fins and the longitudinal axis of said bar member is between 10 and 30°.

References Cited by the Examiner

UNITED STATES PATENTS

| | | | |
|---|---|---|---|
| 2,734,327 | 2/1956 | Whitney | 56—25.4 X |
| 2,836,029 | 5/1958 | Johnson | 56—295 |
| 3,000,165 | 9/1961 | Lill | 56—295 X |
| 3,032,957 | 5/1962 | Boyer | 56—295 X |
| 3,049,853 | 8/1962 | Horner et al. | 56—25.4 |

ABRAHAM G. STONE, *Primary Examiner.*

M. C. PAYDEN, *Assistant Examiner.*